US009383494B2

(12) United States Patent
Shin et al.

(10) Patent No.: US 9,383,494 B2
(45) Date of Patent: Jul. 5, 2016

(54) POLARIZING PLATE AND LIQUID CRYSTAL DISPLAY INCLUDING THE SAME

(71) Applicants: Kwang Ho Shin, Uiwang-si (KR); Dong Yoon Shin, Uiwang-si (KR); Eun Su Park, Uiwang-si (KR); Hae Ryong Chung, Uiwang-si (KR); Eun Kyeong Seo, Uiwang-si (KR)

(72) Inventors: Kwang Ho Shin, Uiwang-si (KR); Dong Yoon Shin, Uiwang-si (KR); Eun Su Park, Uiwang-si (KR); Hae Ryong Chung, Uiwang-si (KR); Eun Kyeong Seo, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 38 days.

(21) Appl. No.: 13/716,861

(22) Filed: Dec. 17, 2012

(65) Prior Publication Data

US 2013/0162930 A1    Jun. 27, 2013

(30) Foreign Application Priority Data

Dec. 26, 2011    (KR) .................. 10-2011-0142835

(51) Int. Cl.
*G02F 1/13363*    (2006.01)
*G02F 1/1335*    (2006.01)
*G02B 5/30*    (2006.01)

(52) U.S. Cl.
CPC .......... *G02B 5/3083* (2013.01); *G02F 1/13362* (2013.01)

(58) Field of Classification Search
CPC combination set(s) only.
See application file for complete search history.

(56) References Cited

U.S. PATENT DOCUMENTS

| 4,592,623 A | * | 6/1986 | Yamamoto et al. ...... 359/487.02 |
| 2003/0048396 A1 | * | 3/2003 | Ishii et al. ....................... 349/96 |
| 2012/0229732 A1 | | 9/2012 | Koike et al. |

FOREIGN PATENT DOCUMENTS

| CN | 102096142 A | | 6/2011 | |
| JP | 11-070629 A | | 3/1999 | |
| JP | 2000-338327 A | | 12/2000 | |
| JP | 2010-237245 | * | 10/2010 | .......... G02F 1/13363 |
| JP | 2010-237245 A | | 10/2010 | |
| JP | 2011-059488 | * | 3/2011 | ............... G02B 5/30 |
| JP | 2011-059488 A | | 3/2011 | |
| JP | 2011-107198 A | | 6/2011 | |
| TW | 201007228 A1 | | 2/2010 | |
| TW | 201034853 A1 | | 10/2010 | |

OTHER PUBLICATIONS

Korean Office Action in KR 10-2011-0142835, dated Oct. 25, 2013 (Shin, et al.).
Taiwanese Office Action dated Jun. 24, 2015 in Corresponding Taiwanese Patent Application No. 101149610.
Office Action mailed Sep. 2, 2014 in corresponding Chinese Patent Application No. 201210559009.7.

* cited by examiner

*Primary Examiner* — Edward Glick
*Assistant Examiner* — Anthony G Quash
(74) *Attorney, Agent, or Firm* — Lee & Morse, P.C.

(57) ABSTRACT

A polarizing plate includes a polarizer and at least one protective film on at least one side of the polarizer. The protective film has an in-plane retardation (Re) of greater than about 10,000 nm at a wavelength of 550 nm, as calculated by Re=(nx−ny)×d, wherein nx and ny are indexes of refraction in x-axis and y-axis directions of the protective film, respectively, and d is a thickness of the protective film.

17 Claims, 2 Drawing Sheets

POLARIZING PLATE AND LIQUID CRYSTAL DISPLAY INCLUDING THE SAME

CROSS-REFERENCE TO RELATED APPLICATION

The present application claims priority under 35 U.S.C. §119 to Korean Patent Application No. 10-2011-0142835, filed on Dec. 26, 2011, in the Korean Intellectual Property Office, and entitled: "Polarizing Plate and Liquid Crystal Display Including the Same," which is incorporated by reference herein in its entirety.

BACKGROUND

Applications of liquid crystal displays have been continuously widened from small devices of an initial stage to notebook computers, LCD monitors, color LCD projectors, LCD televisions, car navigation systems, personal phones, outdoor/indoor measurement instruments, and the like. In some applications, such as LCD monitors and LCD televisions, a backlight unit having a high brightness may be used.

SUMMARY

Embodiments may be realized by providing a polarizing plate that includes a polarizer and at least one protective film on at least one side of the polarizer, and the protective film has an in-plane retardation (Re) of greater than about 10,000 nm at a wavelength of 550 nm, as calculated by Equation 1:

$$Re = (nx - ny) \times d, \quad \text{[Equation 1]}$$

wherein nx and ny are indexes of refraction in x-axis and y-axis directions of the protective film, respectively, and d (in nm) is a thickness of the protective film.

The polarizing plate may include a retardation film such that the polarizing plate includes the retardation film, the polarizer, and the protective film sequentially stacked. The in-plane retardation (Re) of the protective film may be from about 10,100 nm to about 50,000 nm at a wavelength of 550 nm.

The protective film may have a degree of biaxiality (Nz) of about 2.0 or less at a wavelength of 550 nm, as calculated by Equation 3:

$$Nz = (nx - nz)/(nx - ny), \quad \text{[Equation 3]}$$

wherein nx, ny, and nz are indexes of refraction in the x-axis, the y-axis, and z axis directions of the protective film, respectively.

The degree of biaxiality (Nz) of the protective film may be from about 1.5 to about 1.7. The resultant of nx-ny in Equation 3 may be from about 0.1 to about 0.2 at a wavelength of 550 nm.

The protective film may be a polyethylene terephthalate film.

Embodiments may also be realized by providing a set of polarizing plates that includes a first polarizing plate and a second polarizing plate. Each of the first and second polarizing plates include a polarizer and at least one protective film on at least one side of the polarizer, and the protective film has an in plane retardation (Re) of greater than about 10,000 nm at a wavelength of 550 nm.

Each of the first and second polarizing plates may be formed by sequentially stacking a retardation film, the polarizer, and the protective film having an in-plane retardation (Re) of greater than about 10,000 nm at a wavelength of 550 nm.

A protective film of the second polarizing plate may have an in-plane retardation (Re) of greater than about 10,000 nm at a wavelength of 550 nm, and a protective film of the first polarizing plate may have an in-plane retardation (Re) of about 10,000 nm or less at a wavelength of 550 nm.

The protective film may have a degree of biaxiality (Nz) of about 2.0 or less at a wavelength of 550 nm, as calculated by Equation 3:

$$Nz = (nx - nz)/(nx - ny), \quad \text{[Equation 3]}$$

wherein nx, ny, and nz are indexes of refraction in the x-axis, the y-axis, and z axis directions of the protective film, respectively.

Embodiments may also be realized by providing a liquid crystal display that includes a liquid crystal display panel, a backlight unit on a rear side of the liquid crystal display panel, and a set of polarizing plates, in which each of first and second polarizing plates includes a polarizer and at least one protective film on at least one side of the polarizer, and the protective film has an in plane retardation (Re) of greater than about 10,000 nm at a wavelength of 550 nm. The first polarizing plate is on a front side of the liquid crystal display panel, and the second polarizing plate is interposed between the liquid crystal display panel and the backlight unit.

Each of the first and second polarizing plates may be formed by sequentially stacking a retardation film, the polarizer, and the protective film having the in-plane retardation (Re) of greater than about 10,000 nm at a wavelength of 550 nm.

A protective film of the second polarizing plate may have an in-plane retardation (Re) of greater than about 10,000 nm at the wavelength of 550 nm, and a protective film of the first polarizing plate may have an in-plane retardation (Re) of about 10,000 nm or less at a wavelength of 550 nm.

The protective film may have a degree of biaxiality (Nz) of about 2.0 or less at a wavelength of 550 nm, as calculated by Equation 3:

$$Nz = (nx - nz)/(nx - ny), \quad \text{[Equation 3]}$$

wherein nx, ny, and nz are indexes of refraction in the x-axis, the y-axis, and z axis directions of the protective film, respectively.

The protective film may be a polyethylene terephthalate film.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
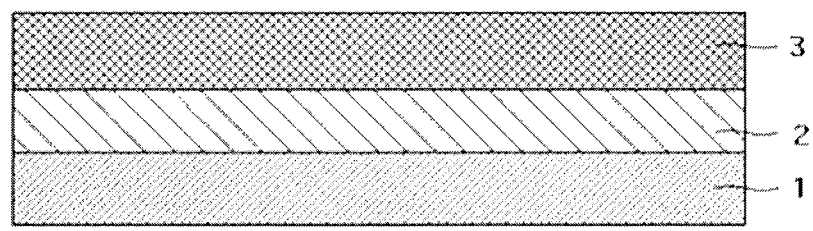
FIG. 1 illustrates a sectional view of a polarizing plate according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Like reference numerals refer to like elements throughout.

In exemplary embodiments, a polarizing plate may include a polarizer and at least one protective film formed on at least one side of the polarizer, which protective film may have an in-plane retardation (Re) of greater than about 10,000 nm at a wavelength of 550 nm. When the in-plane retardation (Re) of the protective film is greater than about 10,000 nm at a wavelength of 550 nm, the polarizing plate may have improved characteristics such that the protective film may avoid or minimize the occurrence of, e.g., a rainbow stain, light leakage through lateral sides of a liquid crystal display, significant variation of retardation according to incident angle, and/or a great difference in retardation according to wavelength.

The in-plane retardation (Re) may be within a range from about 10,100 nm to about 50,000 nm. For example, the in-plane retardation (Re) may be within ranges such as from about 10,100 nm to about 15,500 nm at a wavelength of 550 nm, from about 12,000 nm to about 20,000 nm at a wavelength of 550 nm, from about 15,000 nm to about 25,000 nm at a wavelength of 550 nm, from about 22,000 nm to about 30,000 nm at a wavelength of 550 nm, from about 13,000 nm to about 16,000 nm at a wavelength of 550 nm, etc.

The in-plane retardation (Re) of the protective film may be calculated by Equation 1:

$$Re=(nx-ny) \times d, \quad \text{[Equation 1]}$$

wherein nx and ny are indexes of refraction in x-axis and y-axis directions of the protective film, respectively, and d (in nm) is a thickness of the protective film.

In the protective film, the nx-ny may range from about 0.1 to about 0.2 at a wavelength of 550 nm. Within this range, it may be possible to prevent the generation of a rainbow stain or reduce the possibility of generating a rainbow stain. The resultant protective film may be free from rainbow stain since variation of the retardation according to incident angles and wavelengths may be kept small.

The result of nx-ny may be within ranges such as from 0.12 to about 0.18 at a wavelength of 550 nm, from 0.15 to about 0.2 at a wavelength of 550 nm, from 0.10 to about 0.15 at a wavelength of 550 nm, from 0.13 to about 0.17 at a wavelength of 550 nm, etc.

A retardation in a thickness direction (Rth) of the protective film may be about 15,000 nm or less at a wavelength of 550 nm, as calculated by Equation 2:

$$Rth=((nx+ny)/2-nz) \times d, \quad \text{[Equation 2]}$$

wherein nx, ny, and nz are indexes of refraction in the x-axis, y-axis, and z-axis (thickness) directions of the protective film, respectively, and d(in nm) is the thickness of the protective film.

In the protective film, Rth may be 15,000 nm or less at a wavelength of 550 nm. For example, Rth may be within ranges such as from about 10,000 nm to about 12,000 nm at a wavelength of 550 nm, from about 10,000 nm to about 15,000 nm at a wavelength of 550 nm, from about 10,000 nm to about 12,000 nm at a wavelength of 550 nm, etc.

Nz indicates the degree of biaxiality, and Nz may be obtained by Equation 3:

$$Nz=(nx-nz)/(nx-ny), \quad \text{[Equation 3]}$$

where nx, ny, and nz are indexes of refraction in the x-axis, y-axis, and z-axis (thickness) directions of the protective film, respectively.

In the protective film, Nz may be about 2.0 or less. For example, Nz may be about 1.5 to about 1.7, at a wavelength of 550 nm. The Nz may be within ranges such as from about 1.55 to about 1.65, from 1.60 to about 1.80, etc.

Figure 3:
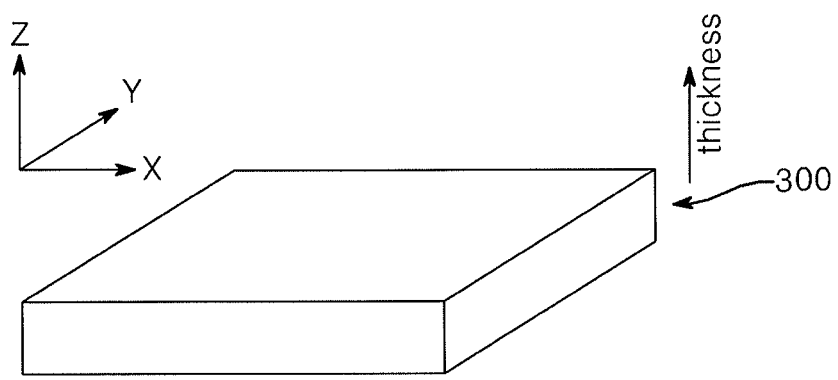
FIG. 3 illustrates a conceptual view of a protective film according to one embodiment of the present invention.

FIG. 3 is a conceptual view of the protective film. Referring to FIG. 3, the protective film (300) may have x-axis direction along the length direction of the protective film, y-axis direction along the width direction of the protective film, and z-axis direction along the thickness direction of the protective film.

The protective film may have a thickness of about 25 μm to about 500 μm. Within this range, the protective film can be used for a polarizing plate by being attached to the polarizer. The protective film may, e.g., have a thickness from about 25 μm to about 200 μm, from about 25 μm to about 115 μm, etc.

The protective film may be made of a material selected from the group of celluloses, polyesters, cyclic polyolefins, polycarbonates, polyethersulfones, polysulfones, polyamides, polyimides, polyolefins, polyarylates, polyvinyl alcohols, polyvinyl chlorides, polyvinylidene chlorides, and mixtures thereof, without being limited thereto. For example, a polyester film formed of polyethylene terephthalate (PET) may be used.

According to exemplary embodiments, any polarizer generally used in the manufacture of the polarizing plate may be used without limitation. For example, the polarizer may be formed by dyeing a polyvinyl alcohol film with iodine or dichroic dyes and stretching the dyed film in a certain direction. The polarizer may be manufactured by, e.g., ones of swelling, dyeing, and stretching, optionally together with cross-linking. Well-known process in the art for manufacturing a polarizer may be used.

The polarizer may have a thickness ranging from about 20 μm to about 30 μm, without being limited thereto.

The protective film may be attached to the polarizer by any suitable method. For example, the protective film may be attached to the polarizer via an adhesive layer. The adhesive layer may be formed using common adhesive agents, e.g., water-based adhesives, pressure-sensitive adhesives, and the like.

In the polarizing plate, the protective film may be attached to one side or opposing sides of the polarizer. In exemplary embodiments, the protective film is only attached to one side of the polarizer. For example, in this case, the polarizing plate may further include a retardation film. The polarizing plate may be formed by sequentially stacking a retardation film, a polarizer, and a protective film having an in-plane retardation (Re) of greater than about 10,000 nm at a wavelength of 550 nm. In one embodiment, the retardation film may be attached to a liquid crystal display panel via a pressure-sensitive adhesive.

In the polarizing plate according to an exemplary embodiment, the protective film may further include a surface coating layer. For example, the surface coating layer may be formed between the polarizer and the protective film. The surface coating layer may include hydrophobic and/or hydrophilic functional groups.

The protective film may have a hydrophobic surface. For example, when a polyethylene terephthalate film is used as the protective film, hydrophobicity of the protective film may be increased. In order to use such a protective film for the polarizing plate, a surface of the protective film such that the hydrophobic surface of the film may be changed to a hydrophilic surface. Surface modifications that use sodium hydroxide to modify the surface of a cellulose film can provide insufficient modification of the surface of the polyethylene terephthalate protective film, or can damage the surface of the polyethylene terephthalate protective film. Accordingly, the surface coating layer including, e.g., a primer containing hydrophobic and hydrophilic functional groups, may be formed on the protective film. Examples of primers containing hydrophobic and hydrophilic functional groups may include polyester resins, polyvinyl acetate resins, and combinations thereof, without being limited thereto.

By adding the surface coating layer to the protective film to, e.g., maximize mechanical properties while minimizing moisture permeability, the polarizing plate may exhibit high resistance against external conditions. Further, the surface coating layer formed between the protective film and the polarizer may increase adhesion therebetween.

FIG. 1 illustrates a sectional view of a polarizing plate according to an exemplary embodiment.

Referring to FIG. 1, the polarizing plate according to an exemplary embodiment may include a polarizer 2 and a protective film 3 stacked on one side of the polarizer 2. In the polarizing plate, the polarizer 2 may be stacked on an upper side of a retardation film 1 and the protective film 3 may be stacked on an upper side of the polarizer 2. The retardation film 1 may be attached to a liquid crystal display panel (not shown) through an adhesive layer (not shown).

According to exemplary embodiments, any retardation film commonly used for a polarizing plate and having retardation compensation properties may be used without limitation. For example, the retardation film may function to compensate for a phase difference of $\lambda/4$.

The retardation film may be formed of acrylic compounds, cellulose compounds, or a combination thereof. For example, the retardation film may be formed of a cellulose film such as a triacetylcellulose (TAC) film.

The retardation film may adjust retardation or improve viewing angle characteristics by, e.g., adjusting optical properties of light passing through a liquid crystal display panel.

The retardation film may have a thickness ranging from about 10 µm to about 100 µm. Within this range, the retardation film may provide optical compensation effects and desired polarizing properties to a liquid crystal display, and may reduce the possibility of and/or prevent color change and stain generation. According to an exemplary embodiment, the retardation film may have a thickness ranging from about 40 µm to about 80 µm.

A liquid crystal display may include a liquid crystal display panel, a backlight unit, and a polarizing plate. The polarizing plate may be used as an upper polarizing plate or a lower polarizing plate in the liquid crystal display. The term "upper polarizing plate" as used herein may indicate a polarizing plate placed on a front side of the liquid crystal display panel, and the term "lower polarizing plate" used herein may indicate a polarizing plate interposed between a rear side of the liquid crystal display panel and the backlight unit.

According to exemplary embodiments, a set of polarizing plates may include the polarizing plate. The set of polarizing plates may include a first polarizing plate and a second polarizing plate. For example, each of the first and second polarizing plates may include a polarizer and at least one protective film formed on at least one side of the polarizer. At least one of the protective films may have an in-plane retardation (Re) of greater than about 10,000 nm at a wavelength of 550 nm.

The first and second polarizing plates may be used as the upper polarizing plate placed on the front side of the liquid crystal display panel and the lower polarizing plate interposed between a rear side of the liquid crystal display panel and the backlight unit, respectively.

The first polarizing plate may be used as the upper polarizing plate placed on the front side of the liquid crystal display panel, and the second polarizing plate may be used as the lower polarizing plate interposed between a rear side of the liquid crystal display panel and the backlight unit. Accordingly to an exemplary embodiment, each of the first and second polarizing plates may be formed by sequentially stacking the retardation film, the polarizer, and the protective film.

In one embodiment, the protective film of each of the first and second polarizing plates may have an in-plane retardation (Re) of greater than about 10,000 nm at a wavelength of 550 nm. The in-plane retardations (Re) of the protective films of the first and second polarizing plates may be equal or different at a wavelength of 550 nm. For example, the protective film of each of the first and second polarizing plates may have an in-plane retardation (Re) from about 10,100 nm to about 50,000 nm and/or from about 10,100 nm to about 15,500 nm, at a wavelength of 550 nm.

The protective film of the second polarizing plate may have an in-plane retardation (Re) of greater than about 10,000 nm at a wavelength of 550 nm, and the protective film of the first polarizing plate may have an in-plane retardation (Re) of about 10,000 nm or less at a wavelength of 550 nm. The protective film of the second polarizing plate may have an in-plane retardation (Re) from about 10,100 nm to about 50,000 nm, e.g., from about 10,100 nm to about 15,500 nm, at a wavelength of 550 nm. The protective film of the first polarizing plate may have an in-plane retardation (Re) from about 2,000 nm to about 10,000 nm, e.g., from about 2,750 nm to about 8,250 nm, at a wavelength of 550 nm.

In an exemplary embodiment, a liquid crystal display may include the above polarizing plate or the set of polarizing plates. For example, the liquid crystal display may include a liquid crystal display panel, a backlight unit placed on a rear side of the liquid crystal display panel, a first polarizing plate placed on a front side of the liquid crystal display panel, and a second polarizing plate interposed between the liquid crystal display panel and the backlight unit. Each of the first and second polarizing plates may include a polarizer and at least one protective film formed on at least one side of the polarizer. At least one of the protective films may have an in-plane retardation (Re) of greater than 10,000 nm at a wavelength of 550 nm.

Figure 2:
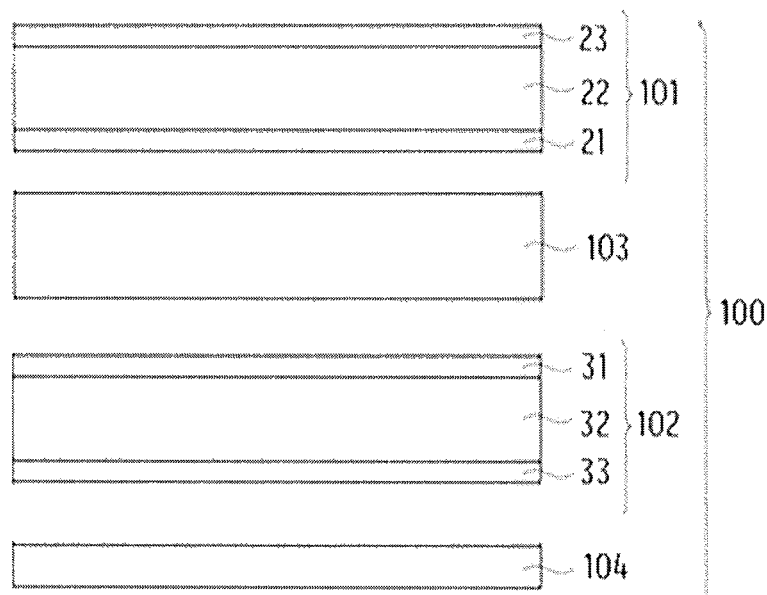
FIG. 2 illustrates a sectional view of a liquid crystal display according to an exemplary embodiment.

FIG. 2 illustrates a sectional view of a liquid crystal display according to an exemplary embodiment.

Referring to FIG. 2, the liquid crystal display 100 may include a liquid crystal display panel 103, a backlight unit 104 placed on a rear side of the liquid crystal display panel 103, a first polarizing plate 101 placed on a front side of the liquid crystal display panel 103, and a second polarizing plate 102 interposed between the liquid crystal display panel 103 and the backlight unit 104.

The backlight unit 104 may include, e.g., a light guide plate, a reflective sheet, a diffusive sheet, etc. Each of the first and second polarizing plates 101 and 102 may be formed by sequentially stacking a retardation film, a polarizer, and a protective film.

For example, the first polarizing plate 101 may include one protective film 23 stacked on one side of the polarizer 22. Although the protective film 23 is illustrated as being stacked on one side of the polarizer 22, it may be stacked on both sides thereof. The first polarizing plate 101 may further include a retardation film 21 formed on the other side of the polarizer 22. The protective film 23 and the retardation film 21 may be attached to the polarizer 22 via an adhesive layer (not shown), and the retardation film 21 may be attached to the liquid crystal display panel 103 via an adhesive layer (not shown).

For example, the second polarizing plate 102 may include one protective film 33 stacked on one side of the polarizer 32. Although the protective film 33 is illustrated as being stacked on one side of the polarizer 32, it may be stacked on both sides thereof. The second polarizing plate 102 may further include a retardation film 31 formed on the other side of the polarizer 32. The protective film 33 and the retardation film 31 may be attached to the polarizer 32 via an adhesive layer (not shown), and the retardation film 31 may be attached to the liquid crystal display panel 103 via an adhesive layer (not shown).

At least one of the protective films 23 and 33 may have an in-plane retardation (Re) of greater than about 10,000 nm at a wavelength of 550 nm.

In an exemplary embodiment, the protective films 23 and 33 of the first and second polarizing plates, respectively, may have an in-plane retardation (Re) of greater than about 10,000 nm at a wavelength of 550 nm. The in-plane retardations (Re) of the protective films 23 and 33 of the first and second polarizing plates may be equal or different at a wavelength of 550 nm. The protective film 23 and 33 of each of the first and second polarizing plates may have an in-plane retardation (Re) from about 10,100 nm to about 50,000 rim, e.g., from about 10,100 nm to about 15,500 nm, at a wavelength of 550 nm.

According to another exemplary embodiment, the protective film 33 of the second polarizing plate may have an in-plane retardation (Re) of greater than about 10,000 nm at a wavelength of 550 nm, and the protective film 23 of the first polarizing plate may have an in-plane retardation (Re) of about 10,000 nm or less at a wavelength of 550 nm. The protective film 33 of the second polarizing plate 102 may have an in-plane retardation (Re) from about 10,100 nm to about 50,000 nm, e.g., from about 10,100 nm to about 15,500 nm, at a wavelength of 550 nm. The protective film 23 of the first polarizing plate 101 may have an in-plane retardation (Re) from about 2,000 nm to about 10,000 nm, e.g., from about 2,750 nm to about 8,250 nm, at a wavelength of 550 nm.

Descriptions of details apparent to those skilled in the art may be omitted herein.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Detailed specifications of polarizing plates of Examples and Comparative Examples were as follows:

(1) Polarizers were made of a polyvinyl alcohol film (thickness: 60 μm, VF-PS6000, Kuraray Co., Ltd., Japan).

(2) Various protective films were made of PET films having:

a) in-plane retardation of 15,500 nm (thickness: 115 μm, A4300, Toyobo Co., Ltd., Japan), b) in-plane retardation of 10,100 nm (thickness: 100 μm, TA016, Toyobo Co., Ltd., Japan), c) in-plane retardation of 8,250 nm (thickness: 75 μm, TA014, Toyobo Co., Ltd., Japan), d) in-plane retardation of 5,500 nm (thickness: 75 μm, TA015, Toyobo Co., Ltd., Japan), e) in-plane retardation of 4,180 nm (thickness: 38 μm, A2406, Toyobo Co., Ltd., Japan), and f) in-plane retardation of 2,750 nm (thickness: 25 μm, Al 100, Toyobo Co., Ltd., Japan).

* The in-plane retardation was calculated by Equation 1 at a wavelength of 550 nm.

(3) Retardation film were made of a triacetyl cellulose film (thickness: 40 μm, KC4DR-1, Fuji Co., Ltd., Japan); and (4) Surface coating layers were formed using a polyester coating solution.

Examples 1 to 7

A polarizer was prepared by dyeing and stretching the polyvinyl alcohol film. Particularly, the polarizer was prepared by stretching the polyvinyl alcohol film by 3 times an original length at 60° C., adsorbing iodine to the film, and stretching the film again by 2.5 times in an aqueous boric acid solution at 40° C.

The retardation film was attached to one side of the polarizer using an adhesive agent (Z-200, Nippon Goshei Co., Ltd., Japan). Each of the first and second polarizing plates was prepared by forming a surface coating layer on the protective film listed in Table 1 and then attaching the protective film to the other side of the polarizer using the adhesive agent (Z-200, Nippon Goshei Co., Ltd., Japan).

For convenience, assuming that a liquid crystal display includes a liquid crystal display panel and a backlight unit placed on a rear side of the liquid crystal display panel, the first polarizing plate was defined as the polarizing plate placed on the front side of the liquid crystal display panel and the second polarizing plate was defined as the polarizing plate interposed between the liquid crystal display panel and the backlight unit.

Comparative Examples 1 to 3

The first and second polarizing plates were prepared in the same manner as in Examples 1 to 7 except that the protective films of the first and second polarizing plates were prepared as listed in Table 1.

TABLE 1

|  | In-plane retardation of protective film of first polarizing plate (nm) | In-plane retardation of protective film of second polarizing plate (nm) |
| --- | --- | --- |
| Example 1 | 10,100 | 10,100 |
| Example 2 | 10,100 | 15,500 |
| Example 3 | 15,500 | 10,100 |
| Example 4 | 15,500 | 15,500 |
| Example 5 | 8,250 | 10,100 |
| Example 6 | 5,500 | 15,500 |
| Example 7 | 2,750 | 15,500 |
| Comparative Example 1 | 2,750 | 2,750 |
| Comparative Example 2 | 4,180 | 4,180 |
| Comparative Example 3 | 8,250 | 8,250 |

Each combination of the first and second polarizing plates prepared in the examples and the comparative examples was evaluated as to the following properties, and results are shown in Table 2.

(1) Generation of rainbow stain: Each of the first and second polarizing plates obtained in the examples and the comparative examples was assembled to the liquid crystal display panel. Upon assembly, the first polarizing plate was placed on the front side of the liquid crystal display panel and the second polarizing plate was interposed between the liquid crystal display panel and the backlight unit. Generation of rainbow stain was monitored using a spectroradiometer (SR-3A, Topcon Corporation, Japan). Marks were provided to indicate the cases where the rainbow stain was not generated (×); the rainbow stain was lightly generated (Δ); the rainbow stain was generated to some degrees (○); and the rainbow stain was strongly generated (⊚).

(2) Adhesive strength: The adhesive strengths of the polarizing plates obtained in the examples and the comparative examples were measured using an adhesion tester (Scicas). Marks were provided to indicate the cases where the adhesive strength was bad (×); the adhesive strength was normal (Δ); the adhesive strength was good (○); and the adhesive strength was excellent (⊚).

TABLE 2

|  | Generation of the rainbow stain | Adhesive strength |
|---|---|---|
| Example 1 | × | ⊚ |
| Example 2 | × | ⊚ |
| Example 3 | × | ⊚ |
| Example 4 | × | ⊚ |
| Example 5 | Δ | ⊚ |
| Example 6 | Δ | Δ |
| Example 7 | Δ | Δ |
| Comparative Example 1 | ⊚ | × |
| Comparative Example 2 | ⊚ | × |
| Comparative Example 3 | ○ | ○ |

As can be seen from Table 2, the liquid crystal display using the polarizing plate including the protective film having an in-plane phase retardation of greater than 10,000 nm did not generate any rainbow stain or otherwise only generated a slight rainbow stain. Accordingly, the liquid crystal display using the protective film according to exemplary embodiments could maintain image quality and had good adhesive strength. However, the liquid crystal display using the polarizing plate including both protective films having an in-plane phase retardation of 10,000 nm or less generated rainbow stain and had undesired adhesive strength.

By way of summation and review, polarizing plates may be placed on opposite sides of a display panel such as a liquid crystal panel to control a direction of light in order to visualize a display pattern of a display device. Accordingly, polarizing films used for the polarizing plate having improved properties is desirable.

The polarizing plate may include a polarizer and protective films attached to at least one of opposite sides of the polarizer. The protective film may protect the polarizer having a relatively weak mechanical strength. Further, the protective film may compensate for viewing angle by adequate retardation through stretching.

Triacetyl cellulose (TAC) films are widely used as protective films. However, triacetyl cellulose films are more expensive than general polymer films. As a result, polymer films have been used as the protective film, and in particular, a polarizing plate including a protective film made of a polyethylene terephthalate film has been developed. However, the polyethylene terephthalate film is stretched by a low elongation ratio when attached to a polarizing plate, and thus there exist some difficulty in ensuring physical properties of the film due to, e.g., poor mechanical strength thereof and poor image quality resulting from generation of rainbow stains when the film is applied to a liquid crystal display after being stretched by a high elongation ratio.

In contrast, embodiments relate to a polarizing plate having improved characteristics, a set of polarizing plates including the same, and a liquid crystal display including the same. For example, exemplary embodiments relate to a polarizing plate that may suppress generation of rainbow stains, may be able to ensure consistent quality and viewing angle, and has excellent price competiveness, a set of polarizing plates including the same, and a liquid crystal display including the same.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A polarizing plate, comprising:
   a polarizer; and
   at least one protective film on at least one side of the polarizer, the protective film having an in-plane retardation (Re) of greater than about 10,000 nm at a wavelength of 550 nm, as calculated by Equation 1:

$$Re = (nx-ny) \times d, \qquad \text{[Equation 1]}$$

wherein, in Equation 1, nx and ny are indexes of refraction in x-axis and y-axis directions of the protective film, respectively, and d is a thickness of the protective film, and
   the protective film has a retardation in a thickness direction (Rth) of about 10,000 nm to about 12,000 nm at a wavelength of 550 nm, as calculated by Equation 2:

$$Rth = ((nx+ny)/2 - nz) \times d, \qquad \text{[Equation 2]}$$

wherein, in Equation 2, nx, ny, and nz are indexes of refraction in the x-axis direction, the y-axis direction, and a z-axis direction of the protective film, respectively, and d is the thickness of the protective film.

2. The polarizing plate as claimed in claim 1, further comprising a retardation film such that the polarizing plate includes the retardation film, the polarizer, and the protective film sequentially stacked.

3. The polarizing plate as claimed in claim 1, wherein the in-plane retardation (Re) of the protective film is from about 10,100 nm to about 50,000 nm at a wavelength of 550 nm.

4. The polarizing plate as claimed in claim 1, wherein the protective film has a degree of biaxiality (Nz) of about 2.0 or less at a wavelength of 550 nm, as calculated by Equation 3:

$$Nz = (nx-nz)/(nx-ny), \qquad \text{[Equation 3]}$$

wherein nx, ny, and nz are indexes of refraction in the x-axis, the y-axis, and z-axis directions of the protective film, respectively.

5. The polarizing plate as claimed in claim 4, wherein the degree of biaxiality (Nz) of the protective film is from about 1.5 to about 1.7.

6. The polarizing plate as claimed in claim 4, wherein nx-ny in Equation 3 is from about 0.1 to about 0.2 at a wavelength of 550 nm.

7. The polarizing plate as claimed in claim 1, wherein the protective film is a polyethylene terephthalate film.

8. A set of polarizing plates, comprising:
   a first polarizing plate including a first polarizer and at least one first protective film on at least one side of the first polarizer; and
   a second polarizing plate including a second polarizer and at least one second protective film on at least one side of the second polarizer, at least one of the first or second protective film having an in-plane retardation (Re) of greater than about 10,000 nm at a wavelength of 550 nm, and at least one of the first or second protective film has a retardation in a thickness direction (Rth) of about 10,000 nm to about 12,000 nm at a wavelength of 550 nm, as calculated by Equation 2:

$$Rth = ((nx+ny)/2 - nz) \times d, \qquad \text{[Equation 2]}$$

wherein, in Equation 2, nx, ny, and nz are indexes of refraction in the x-axis direction, the y-axis direction, and a z-axis direction of the first or second protective film, respectively, and d is the thickness of the first or second protective film.

9. The set of polarizing plates as claimed in claim 8, wherein each of the first and second polarizing plates is formed by sequentially stacking a retardation film, the first or second polarizer, and the first or second protective film, both the first and second protective film having an in-plane retardation (Re) of greater than about 10,000 nm at a wavelength of 550 nm.

10. The set of polarizing plates as claimed in claim 8, wherein the second protective film of the second polarizing plate has an in-plane retardation (Re) of greater than about 10,000 nm at a wavelength of 550 nm, and the first protective film of the first polarizing plate has an in-plane retardation (Re) of less than 10,000 nm at a wavelength of 550 nm.

11. The set of polarizing plates as claimed in claim 8, wherein at least one of the first or second protective film has a degree of biaxiality (Nz) of about 2.0 or less at a wavelength of 550 nm, as calculated by Equation 3:

$$Nz = (nx-nz)/(nx-ny), \qquad \text{[Equation 3]}$$

wherein nx, ny, and nz are indexes of refraction in the x-axis, the y-axis, and z-axis directions of the first or second protective film, respectively.

12. A liquid crystal display, comprising:
a liquid crystal display panel;
a backlight unit on a rear side of the liquid crystal display panel; and
the set of polarizing plates as claimed in claim 8;
wherein the first polarizing plate is on a front side of the liquid crystal display panel, and the second polarizing plate is interposed between the liquid crystal display panel and the backlight unit.

13. The liquid crystal display as claimed in claim 12, wherein each of the first and second polarizing plates is formed by sequentially stacking a retardation film, the first or second polarizer, and the first or second protective film, both the first and second protective film having the in-plane retardation (Re) of greater than about 10,000 nm at a wavelength of 550 nm.

14. The liquid crystal display as claimed in claim 13, wherein the first protective film of the first polarizing plate has an in-plane retardation (Re) that is different from the in-plane retardation (Re) of the second protective film of the second polarizing plate.

15. The liquid crystal display as claimed in claim 12, wherein the second protective film of the second polarizing plate has an in-plane retardation (Re) of greater than about 10,000 nm at the wavelength of 550 nm, and the first protective film of the first polarizing plate has an in-plane retardation (Re) of less than 10,000 nm at a wavelength of 550 nm.

16. The liquid crystal display as claimed in claim 12, wherein at least one of the first or second protective film has a degree of biaxiality (Nz) of about 2.0 or less at a wavelength of 550 nm, as calculated by Equation 3:

$$Nz = (nx-nz)/(nx-ny), \qquad \text{[Equation 3]}$$

wherein nx, ny, and nz are indexes of refraction in the x-axis, the y-axis, and z-axis directions of the first or second protective film, respectively.

17. The liquid crystal display as claimed in claim 12, wherein the first or second protective film is a polyethylene terephthalate film.

* * * * *